United States Patent
Sun et al.

(10) Patent No.: US 10,135,918 B2
(45) Date of Patent: Nov. 20, 2018

(54) DYNAMICALLY ADJUSTING AN ENTITY'S ASSIGNED DATA CENTER BASED ON TRAFFIC PATTERNS

(71) Applicant: Microsoft Technology Licensing, LLC, Redmond, WA (US)

(72) Inventors: Yiwen Sun, Santa Clara, CA (US); Hao Liu, Sunnyvale, CA (US); Rongsheng Liang, Cupertino, CA (US); Jianhong Fang, Milpitas, CA (US); Shangcheng Ying, Shanghai (CN); Hailin Wu, Sunnyvale, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 177 days.

(21) Appl. No.: 15/370,190

(22) Filed: Dec. 6, 2016

(65) Prior Publication Data
US 2018/0159924 A1  Jun. 7, 2018

(51) Int. Cl.
G06F 15/173 (2006.01)
H04L 29/08 (2006.01)
H04L 12/26 (2006.01)
H04L 29/06 (2006.01)

(52) U.S. Cl.
CPC ...... *H04L 67/1025* (2013.01); *H04L 43/0876* (2013.01); *H04L 67/02* (2013.01); *H04L 67/306* (2013.01); *H04L 67/42* (2013.01)

(58) Field of Classification Search
USPC ....... 709/203, 206, 217, 219, 223, 224, 226, 709/228, 230, 232, 238; 715/811
See application file for complete search history.

(56) References Cited

U.S. PATENT DOCUMENTS

| | | | |
|---|---|---|---|
| 2009/0276771 A1* | 11/2009 | Nickolov | G06F 9/4856 709/203 |
| 2010/0131896 A1* | 5/2010 | Fitzmaurice | G06T 11/60 715/811 |
| 2018/0121461 A1* | 5/2018 | Natarajan | G06F 17/30156 |
| 2018/0150316 A1 | 5/2018 | Oh | |

* cited by examiner

*Primary Examiner* — Quang N Nguyen
(74) *Attorney, Agent, or Firm* — Hickman Palermo Becker Bingham LLP; Daniel D. Ledesma (57) ABSTRACT

Techniques for assigning entities to data centers are provided. In one technique, usage data associated with a particular entity that is assigned to a first data center is generated. The usage data indicates activity of multiple users relative to the particular entity. It is determined, based on the usage data, whether the particular entity is to be assigned to another data center. If so, then the particular entity is assigned to a second data center.

18 Claims, 3 Drawing Sheets

DYNAMICALLY ADJUSTING AN ENTITY'S ASSIGNED DATA CENTER BASED ON TRAFFIC PATTERNS

CROSS-REFERENCE TO RELATED APPLICATIONS

This application is related to U.S. application Ser. No. 15/362,613, filed on Nov. 28, 2016 and to U.S. application Ser. No. 15/370,143, filed on Dec. 6, 2016, the entire contents of each of which are hereby incorporated by reference as if fully set forth herein.

TECHNICAL FIELD

The present disclosure relates generally to data centers and, more specifically, to dynamically adjusting the assignment of entities to data centers based on a history of access of the entities.

BACKGROUND

Some companies and organizations employ data centers to address significant user demand for online content and services. A data center is a facility used to house computer systems and associated components, such as telecommunications and storage systems. A data center may include redundant or backup power supplies, redundant data communications connections, environmental controls (e.g., air conditioning, fire suppression), and various security devices. A data center may contain multiple computing devices hosting services that are client-facing (or that are used to respond directly to client requests) and services that are internal-facing (or that are used to respond to requests from components within the data center itself or from another affiliated data center).

Some companies employ multiple data centers to serve online content and services to end-users. However, different groups of data centers may operate under different paradigms. For example, in one paradigm, different data centers in a group host different content and/or services. Thus, for example, a piece of content is assigned to a first data center in a group and, while external requests for that piece of content may be handled by all data centers in the group, each data center forwards the external requests to the first data center.

In a different paradigm, multiple data centers in a group host the same content and/or services. Thus, all data centers have local access to certain data and services and, accordingly, may individually handle external requests without relying on communicating with other data centers in the group. In this way, data centers may be distributed globally, which results in lower latency for end-users of a data center.

Even in this latter paradigm, however, there may be content that only a single data center in a group should access even though multiple data centers in the group may have access. In this way, some content has a "home" data center. A reason for restricting direct access to a piece of content to a single data center may be due to the nature of the content. In some situations, a data system should not allow reads to certain content until all prior updates to the certain content have been persistently stored. A reason for copying content across multiple data centers even though the content has a home data center may be in case the home data center becomes unavailable, such as in response to an unplanned failure or in response to a planned shutdown, which may be performed for various maintenance reasons. Another data center in the group can take over as the "home" data center for that content.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Entity Assignment

An "entity" is a data object or a service that should only be accessed at a single data center and not multiple data centers. Thus, while an instance of entity may exist in multiple data centers (e.g., for failover reasons), the entity is only assigned to data center (i.e., the "home" data center for that entity). Any requests for the entity need to be made through the home data center. A reason for restricting access to an entity through a single home data center is to prevent overwriting a later version of the entity or reading an incorrect version of the entity.

In an embodiment, each data center stores assignment data that associates each entity of multiple entities with a data center. For example, assignment data stored in each data center indicates that entities A and C are assigned to data center 112 and entity B is assigned to data center 114.

Examples of an entity include an account (e.g., a recruiter account, an advertiser account, a payment account, a sales account), and a contract. If an entity is a data object, then only one or more applications may be configured to access the data object. Instances of those applications may execute in multiple data centers. If an instance of an application executes in a data center (the "receiving data center") other than a home data center of an entity, then that instance requests the entity (through one or more communication channels) from the home data center to which the entity is assigned. Either the home data center or the receiving data center responds to the client device that initiated the request for the entity.

In some scenarios, an entity is shared among multiple end-users; that is, multiple end-users have access to the entity. For example, an entity may be associated with each account of each user of multiple registered users of a social network service provided by a group of data centers. Only users that are associated with the entity are allowed (e.g., read and write) access to the entity. The entity is assigned to a particular data center within the group. All requests initiated by the registered users for the entity are routed to the particular data center. For example, a request (for an entity) received by a first data center is forwarded (based on assignment data stored in the first data center) to a second data center to which the entity is assigned. One complication in this scenario is that an entity may be assigned to a data center that is geographically distant from many users that have access to the entity. Thus, assigning the entity to the proper data center can reduce access times (or latency) for many users.

General Overview

A system and method for dynamically adjusting an assignment of an entity to a data center are provided. Usage of the entity by multiple requestors is tracked and analyzed. Based on the analysis of the usage, a data center (from among multiple data centers) is selected and the entity is assigned to that data center. Thereafter, requests for the entity are routed to that data center.

In a related technique, locations of multiple requestors of an entity are used to select a data center to which an entity should be assigned. Thus, actual usage of the entity is not required. Such a technique may be used to determine where to initially assign an entity.

System Overview

Figure 1:
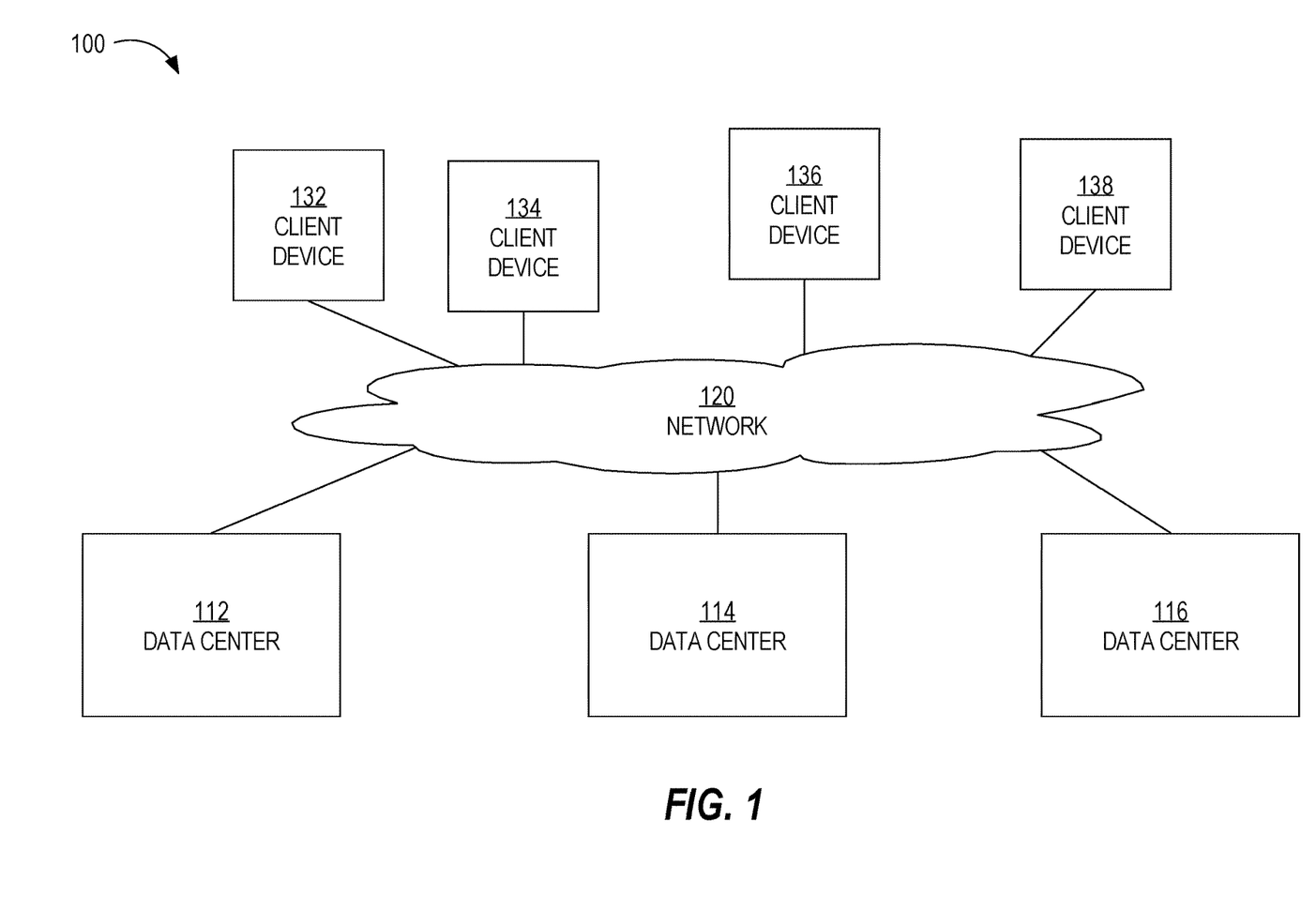
FIG. 1 is a block diagram that depicts a system comprising multiple data centers, in an embodiment.

FIG. 1 is a block diagram that depicts a system 100 comprising multiple data centers, in an embodiment. System 100 comprises data centers 110-116, network 120, and client devices 132-138. Although three data centers are depicted, system 100 may include any number of two or more data centers. Also, although only four client devices are depicted, system 100 may include any number of two or more client devices, each having access to a particular entity.

Network 120 may be implemented on any medium or mechanism that provides for the exchange of data between client devices 132-138 and data centers 110-116. Network 120 may comprise multiple networks, such as one or more Local Area Networks (LANs), one or more Wide Area Networks (WANs), Ethernet or the Internet, and/or one or more terrestrial, satellite or wireless links. In an embodiment, data centers 110-116 are connected to each other using one or more dedicated lines or links instead of over multiple networks or the Internet. Such dedicated lines allow for the relatively fast transmission of data between data centers 110-116.

Each client device 132-138 is a computing device. Examples of computing devices include a laptop computer, a tablet computer, a smartphone, a desktop computer, and a personal digital assistant (PDA), and a wearable device. Each client device executes an application. An example of an application includes a dedicated application that is installed and executed on a local computing device and that is configured to communicate with one of data centers 110-116 over network 120. Another example of an application is a web application that is downloaded (e.g., from one of data centers 110-116) and that executes within a web browser running on a client device.

Data Centers

Although depicted as a single element, each of data centers 110-116 may comprise multiple computing elements and devices, connected in a local network or distributed regionally across multiple networks, such as the Internet. A computing device within a data center may host multiple applications and multiple computing devices within a data center may host different instances of the same set of applications.

For example, each data center may include an account database that contains information about multiples accounts. Some accounts may be associated with a single registered user while other accounts may be associated with multiple registered users. An account database may be stored on one or more storage devices (persistent and/or volatile) that may reside within the same local network as the corresponding data center.

In a social networking context, data centers 110-116 are provided by a social network provider, such as LinkedIn, Facebook, or Google+. In this context, each user account in an account database includes a user profile, each provided by a different user. A user's profile may include a first name, a last name, a digital image of the user, an email address, residence information, a mailing address, a phone number, one or more educational institutions attended, one or more current and/or previous employers, one or more current and/or previous job titles, a list of skills, a list of endorsements, and/or names or identities of friends, contacts, connections of the user, and derived data that is based on actions that the candidate has taken. Examples of such actions include applying to certain jobs, views of job postings, views of company pages, and public messages that the user posted and that are visible to users outside of the user's social network (but that are registered users/members of the social network provider).

Some data within a user's profile (e.g., work history) may be provided by the user while other data within the user's profile (e.g., skills and endorsement) may be provided by a third party, such as a "friend," connection, or colleague of the user.

Services executing within a data center may prompt users to provide profile information in one of a number of ways. For example, a service may have provided a web page with a text field for one or more of the above-referenced types of information. In response to receiving profile information from a user's device, one or more of data centers 110-116 stores the information in an account that is associated with the user and that is associated with credential data that is used to authenticate the user to one of data centers 110-116 when the user attempts to log into his/her account at a later time. Each text string provided by a user may be stored in association with the field into which the text string was entered. For example, if a user enters "Sales Manager" in a job title field, then "Sales Manager" is stored in association with type data that indicates that "Sales Manager" is a job title. As another example, if a user enters "Java programming" in a skills field, then "Java programming" is stored in association with type data that indicates that "Java programming" is a skill.

While some examples herein are in the context of social networking, embodiments are not so limited. The type of data stored in each data center and the type of services provided by each data center are tangential to how entities are determined to be assigned to which data centers.

Location-Based Entity Assignment

In an embodiment, an entity is assigned to a particular data center in a group of data centers based on a location of users in a set of users that have access to the entity (i.e., using their respective client devices). For example, if a majority (or the largest plurality) of users in the set of users are already assigned to data center 112, then an entity to which the set of users has access is also assigned to data center 112. In a related embodiment, client devices (as opposed to users) are assigned to (or otherwise associated with) data centers. For example, if a majority (or the largest plurality) of client devices that have accessed an entity are already assigned to data center 112, then the entity is also assigned to data center 112. Hereafter, "associating a user with a data center" may be synonymous with "associating a client device with a data center," even though the same user may employ different client devices to access a particular entity.

If users are added to or removed from the set of users, then the entity's assignment to a data center may be re-evaluated. For example, if ten users are added to a set of five users that have access to a particular entity and those ten users are all assigned to (or are closest to) data center 114 than data center 112 to which the entity is assigned, then the particular entity is assigned to data center 114.

In an embodiment, an entity is assigned to a data center to which the creator of the entity is assigned or that is closest to the creator. For example, if a user of client device 132 used client device 132 to create an entity and client device 132 is closest to data center 112, then the entity is assigned to data center 112.

"Closeness" of a client device to a data center may be determined in one of many ways, such as geographical distance between the client device and the data center, a number of networks that a request from the client device (or an Internet Service Provider (ISP) of the client device) needs to traverse to arrive at the data center, a number of links between the client device (or an ISP of the client device) and the data center, a number of switches that a request from the client device needs to traverse to arrive at the data center, an average latency between the client device and the data center, or 80% percentile latency between the client device and the data center. Any technique for determining a "closeness" of a client device to a data center may be used.

Additionally, "closeness" may be determined regularly, especially if closeness is defined by latency. For example, client device 132 may submit requests directed to a domain of data centers 112-116. Requests from client device 132 may "naturally" arrive at data center 112. However, periodically or randomly, some requests from client device 132 may be routed to data centers 114 and 116. In this way, a latency value for each request from client device 132 to each of data centers 112-116 may be calculated. If multiple latency values exist for a client device-data center pair, then the multiple latency values may be aggregated to determine an aggregated value, such as an average, a median, a maximum, a minimum, or a certain percentile (e.g., $90^{th}$ percentile). The aggregated value is then associated with the client device-data center pair.

Thereafter, the aggregated latency values of the client device-data center pairs of a particular client device are used to determine which data center is closest to the client device. For example, client device 132 is associated with 130 milliseconds, 123 milliseconds, and 180 milliseconds, respectively, with respect to data centers 112-116. Because the lowest aggregated latency value is 123 milliseconds, client device 132 is deemed to be closest to data center 114.

In some scenarios, the location of a user or client device may change. For example, client device 132 may be a mobile device, such as a laptop computer, a tablet computer, or a smartphone and a user of client device 132 may travel widely such that, at times, client device 132 is closest to data center 112 and, at other times, client device 132 is closest to data center 116. As another example, a user may operate a desktop computer at his/her work to connect to data center 112, but when the user is on a business trip, the user operates a laptop computer to connect to data center 114. Also, each connection involves accessing a particular entity that is assigned to data center 112.

Thus, based on the changing locales of a user or client device, the determination of which data center an entity should be assigned may be made regularly or periodically (e.g., every week) to ensure that the entity is assigned to the proper data center that will minimize the amount of time to access for all users that need to access the entity. Thus, one week, the entity may be assigned to one data center and, based on changing locales of a subset of users in a set of users that have access to the entity, the entity is assigned to another data center.

Usage-Based Entity Assignment

One drawback of the location-based entity assignment approach is that how much an entity is accessed by individual users is ignored. In other words, all users are treated the same. Thus, for example, even though (1) 90% of the users that have access to an entity are associated with data center 112, (2) the remaining 10% of the users that have access to the entity are the only ones accessing the entity and are associated with data center 114, under the location-based entity assignment approach, the entity is assigned to data center 112.

In an embodiment, usage of an entity by a set of users is tracked and used to determine which data center to assign the entity. "Usage" may be determined or calculated based on one or more factors, such as a number of times each user in the set of users has accessed the entity or a number of times each user has used an application that accessed, or is capable of accessing, the entity.

For example, client device 132 accessed a particular entity 20 times, client device 134 accessed the particular entity 16 times, and client device 136 accessed the particular entity 33 times. If client device 136 and either client device 132 or client device 134 are associated with data center 114, then the particular entity is assigned data center 114. If client devices 132 and 134 are associated with data center 112 and only client device 136 is associated with data center 114, then the particular entity is assigned to data center 112.

Thus, a data center is determined for each client device or user that initiated access to a particular entity. Then, for each data center, the number of accesses (of the particular entity) initiated by each client device or user associated with that data center is aggregated. Lastly, the particular entity is assigned to the data center associated with the most accesses.

As another example, client device 132 was used to access a particular web application that is associated with a particular entity. The user operating client device 132 initiated 49 requests through the particular web application. While only one (e.g., HTTP) request was used to launch or load the particular web application, subsequent interactions by the user with a user interface provided by the particular web application totaled 49, even though none of those interactions may have involved the particular entity directly, only indirectly.

In an embodiment, accesses to a particular entity, from a user or client device, where the accesses originated from a different data center than the user's "home" data center (e.g., due to travel), are not considered when determining to which data center the particular entity is to be assigned. Instead, such accesses may be associated with that different data center when totaling the number of accesses for each data center.

The time period in which accesses of a particular entity are considered may be the total "life" or existence of the particular entity or a limited period of time, such as the last 30 days. Thus, accesses that occurred 30 days prior to the day on which an assignment decision is being made are not considered.

In an embodiment, one or more weights are applied to one or more previous accesses based on when those previous accesses occurred relative to other previous accesses. Thus, "older" accesses are less influential on overall usage than "newer" accesses. For example, an access that occurred more than four weeks ago may be considered half of an access that occurred one day ago. Additionally, the weight may be linear or non-linear over time. For example, a weight applied to an access may be calculated using the following linear equation: $w=1-(\frac{1}{30})d$; where w is the weight that is to be applied to an access and d is the number of days ago that the access occurred relative to the day on which assignment decision is being made.

In an embodiment, each access to an entity corresponds to a particular type of access. One or more types of access are assigned a certain weight indicating the relative importance of some types of accesses over other types of accesses. For example, a user assigned to a particular entity interacts (while operating a client device) with a web application from data center 112. Through the web application (which has access to the particular entity), the user requests a home page 10 times, performs 25 searches, and adds 32 notes. If each of these types of accesses are treated equally, then the user accessed the particular entity (or an application associated with the particular entity) 67 times and that number will be added to other numbers reflecting accesses to data center 112, when determining a data center to which the particular entity is to be assigned. However, if some types of accesses are considered more important or more impactful than other types of accesses, then one or more weights may be applied to one or more of the above numbers. For example, home page requests may have a weight of 0.3, searches have a weight of 1.5, and notes have no weight. Thus, in this example, searches have more of an impact on which data center an entity is to be assigned than other types of accesses. Such a weight may reflect that searches generally require more computer resources (e.g., processor time, memory, and database I/O) than the other types of accesses.

Example Process

Figure 2:
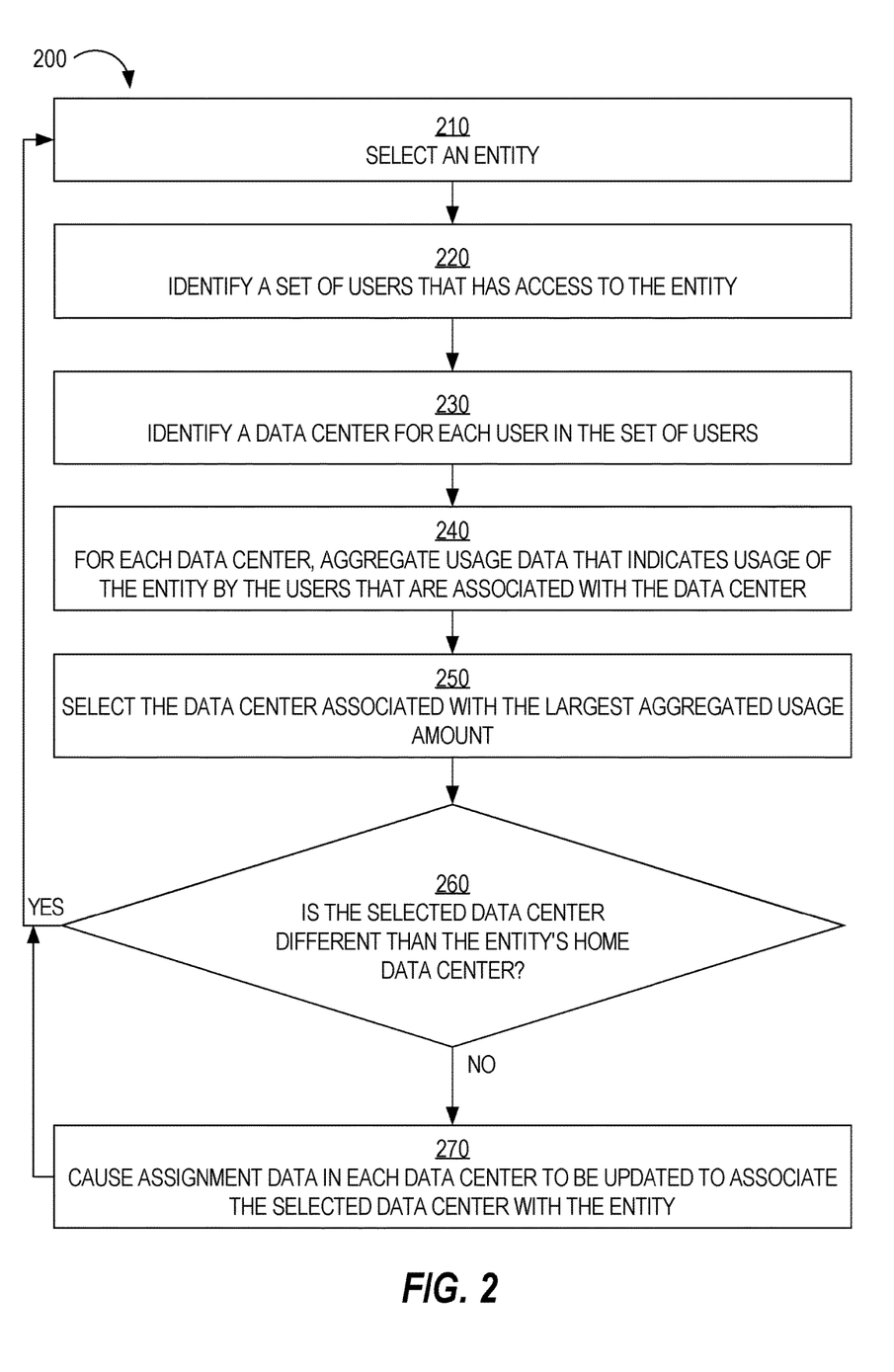
FIG. 2 is a flow diagram that depicts a process for determining a data center to which an entity is to be assigned, in an embodiment.

FIG. 2 is a flow diagram that depicts a process 200 for identifying a data center for an entity, in an embodiment. Process 200 may be performed by a component within one of data centers 112-116 or by a component separate from any of data centers 112-116. Regardless, whichever component (or set of components) implement process 200, that component has access to usage data for the multiple users that have accessed a particular entity.

At block 210, an entity is selected. Which entity is selected when process 200 begins may vary. For example, entities may be selected in a round robin fashion such that an entity is only considered again for assignment if every other assignable entity has been considered. In a related example, an entity is selected based on whether any users are experiencing relatively long latencies when accessing the entity. If no users are experiencing relatively long latencies (e.g., which may be determined by analyzing log records associated with each entity indicating latency times), then the entity might not be selected.

At block 220, a set of users that has access to the entity is identified. Block 220 may involve analyzing an entity record that includes (a) user information that identifies one or more users and/or (b) group-level information that identifies a group, organization, or company. Another record or set of records may need to be analyzed to determine which users are associated with the identified group/organization/company.

At block 230, for each user in the set of users, a data center is identified. Any technique may be used to identify a data center for a user. For example, the data center may be determined by analyzing a pre-existing user-data center assignment list. Alternatively, the data center may be determined by reading a user record that indicates to which data center the user is assigned along with, optionally, other types of information about the user.

At block 240, for each data center, usage data of the entity by all users (in the set of users) that are associated with the data center is aggregated to calculate a usage amount. For example, if users A and B are associated with data center 112 and user A accessed an entity 11 times and user B accessed the entity 18 times, then the usage amount for data center 112 is at least 29.

Block 240 may involve analyzing usage records associated with each user. A usage record may include an entity identifier that uniquely identifies the entity (relative to other entities managed by data centers 112-116), a user identifier that uniquely identifies the user (relative to other users of data centers 112-116) that initiated the access, a date of the access, a time of day of the access, a client device identifier that identifies the client device (e.g., an IP address or a MAC address) that sent a request for the entity or communicated with an application that has access to the entity, and/or a type of access.

If only a certain time period of usage activity is considered, then any usage records outside that time period are ignored. For example, if only the last 30 days of usage activity are considered, then only usage records that indicate a date within the last 30 days are analyzed.

A running total may be kept as each usage record (of each user associated with a particular data center) is identified and used to calculate a usage amount for the particular data center.

At block 250, the data center associated with the largest usage amount is selected as the data center to which the entity is to be assigned.

At block 260, it is determined whether the selected data center is different than the current (or "home") data center of the entity. If so, then, at block 270, assignment data in each data center is updated to reflect that the entity is assigned to the selected data center. In either case, process 200 ends or returns to block 210 where another entity is selected A result similar to the result provided by process 200 described above may be achieved by analyzing usage data of a particular entity before determining which users are associated with (or have access to) the particular entity. For example, process 200 may involve, after identifying (e.g., using a SQL SELECT statement) all usage records associated with a particular entity, for each usage record, identifying a user that initiated the access corresponding to the usage record. Then, a data center with which the identified user is associated is identified. Then, a count or usage amount associated with the identified data center is increased (e.g., incremented). This process repeats until all usage records associated with the particular entity are considered.

Cost-Based Entity Assignment

In an embodiment, an estimated cost of assigning an entity to each of multiple data centers is generated and used to determine to which data center the entity is to be assigned. For example, a cost of assigning an entity to each of data centers 112-116 is calculated and the data center with the lowest estimated cost is selected as the data center to which the entity is to be assigned.

An estimated cost can be generated in a number of ways. For example, a cost may be based on a number of accesses of an entity by each user in a set of users and an aggregated latency of each user accessing the entity. As a specific example, client device 132 accessed a particular entity 20 times, client device 134 accessed the particular entity 16 times, and client device 136 accessed the particular entity 33 times. Also, a median latency of client device 132 connecting to data centers 112-116 are, respectively (in milliseconds), {98, 72, 107}, a median latency of client device 134 connecting to data centers 112-116 are, respectively, {132, 88, 77}, and a median latency of client device 136 connecting to data centers 112-116 are, respectively, {103, 71, 85}. If each of client devices 132-136 accessed the entity and the entity was assigned to data center 112, then the estimated cost would be (20*98)+(16*132)+(33*103)=7471. An estimated cost would then be similarly calculated for each of data centers 114 and 116. For example, the estimated cost if the entity is assigned to data center 114 would be (20*72)+(16*88)+(33*71)=5191 and the estimated cost if the entity is assigned to data center 116 would be (20*107)+(16*77)+(33*85)=6177. The data center associated with the lowest estimated cost of the three (which is data center 114 in this example) would be selected as the data center to which the entity is to be assigned.

Changing an Entity's Assignment

If the particular entity is already assigned to that data center, then no change in assignment data is needed; otherwise, assignment data in each data center is updated. The data center to which an entity is currently assigned (i.e., before an assignment switch) is referred to herein as the "old data center." The data center to which an entity is going to be assigned (i.e., as a result of an assignment switch) is referred to herein as the "new data center."

In an embodiment, once it is determined to switch the assignment of an entity, the old data center for that entity is first notified. The process that notifies the old data center may be executing in the old data center, a different data center, or outside all data centers. The process waits until the old data center acknowledges that the old data center is no longer the home data center for the entity. This is to avoid the situation where different data centers "think" that different data centers are the home data centers for the entity. In response to receiving an acknowledgement from the old data center, the process notifies each other data center in the group of data centers.

Maximum Latency Threshold

In an embodiment, before an entity is assigned to a particular data center, a check is performed to determine whether any user in a set of users that has access to the entity is likely to experience high latency in attempting to access the entity. For example, if any of client devices 132-138 (each of which has access to a particular entity) would experience over one second of latency with respect to data center 112, then only data centers 114 and 116 may be candidates to which the particular entity may be assigned.

If an entity being assigned to any data center in a strict subset of candidate data centers is likely to result in the maximum latency threshold being exceeded, then the entity is assigned to one of the candidate data centers outside that strict subset. The maximum latency threshold may be modified based on user input, such as updating a configuration file that a reassignment program uses to determine the maximum latency threshold. This check of whether the maximum latency threshold may be exceeded may be performed before or after a location-based or usage-based technique is used to identify a data center to which an entity may be assigned. For example, a maximum latency threshold check is performed for each client device-data center pair in order to narrow down the candidate data centers to which a corresponding entity may be assigned.

In some situations, regardless of which data center an entity is to be assigned, at least one client device that has access to the entity is likely suffer latency that exceeds the maximum latency threshold. In this case, the data center that is associated with the least number of users or client devices that will likely experience latency that exceeds the maximum latency threshold is the data center to which the entity will be assigned. Alternatively, the client devices or users may be classified based on how often they access the entity is taken into account. For example, an entity may be assigned to the data center associated with the fewest high frequency access users (e.g., users that access the entity over ten times per week) who will likely suffer from such poor latency when accessing the entity.

User Assignment Optimization

Users may be assigned to data centers based on, for example, geographical location of the users relative to the data centers, latency information of the data centers relative to the users, and load or capacity of the data centers. One reason for doing so is so that users experience the best performance in terms of low latency. Another reason for assigning a user to another data center is if the "home" data center for the user is becoming overloaded with requests and there is a desire to spread requests to data centers that are not as loaded or that have greater computer resource capacity to handle the additional requests.

In an embodiment, embodiments herein leverage a user assignment technique that initially assigns users (or client devices) to data centers. For example, the user assignment technique is used to associate certain user accesses of an entity with certain data centers, as described above in the usage-based entity assignment approach. However, if the user assignment technique is run independently of one or more entity assignment techniques described herein, then some users of an entity may experience higher latency. For example, initially, client device 132 is assigned data center 112. Then, as a result of an entity assignment, an entity to which client device 132 has access is assigned data center 112. Later, using the user assignment technique, client device 132 is assigned to data center 114 and all user accesses initiated by client device 132 are then ascribed to data center 114, which may cause the entity to be assigned to data center 114. All other client devices that are associated with data center 112 will then have to access the entity from data center 114.

In an embodiment, to avoid this situation, before a user assignment technique is used to assign a user to another data center, a check is first performed to determine whether the user has access to an entity that must be assigned to a single data center and that is shared with other users. Such a user is referred to herein as an "enterprise user." If the user is an enterprise user, then the user assignment technique effectively ignores that user and considers another user for reassignment. Thus, all enterprise users are ignored (at least some of the time) when making a user assignment decision.

In a related embodiment, a user assignment technique is applied to enterprise users on a limited basis. For example, a user assignment technique is implemented each week for non-enterprise users while the user assignment technique is implemented every two weeks (or every month) for enterprise users.

Off-Limit Data Centers

In an embodiment, certain data centers are off limits for assigning certain entities. For example, if an entity was created in a data center outside of the United States, then the entity can only be assigned to a data center outside of the United States. Thus, if there is only one data center that is outside the United States and an entity is assigned to that data center, then no entity assignment approach described herein is performed for the entity. However, if there is more than one data center outside the United States and an entity is assigned to one of those data centers, then an entity assignment approach described herein is performed for the entity but only considers the data centers outside of the United States.

In an embodiment, at the time of creation of an entity, an "initial" data center is associated with the entity. The initial data center may be determined by assigning the entity to the home data center of the creator of the entity. Alternatively, an initial data center for an entity may be determined based on a geographic location of the creator of the entity. If the geographic location of the creator of the entity is, for example, outside of the United States, then an initial data center for the entity is a data center that is closest to the creator of the entity and that is outside the United States.

Once an initial data center is identified for an entity, an entity assignment approach determines whether the initial data center is within a first set of data centers (e.g., data centers within the United States). If so, then all data centers (including the first set of data centers) are candidates to which the entity may be assigned. If not, then only a second set of data centers (e.g., data centers outside the United States) are candidates to which the entity may be assigned.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
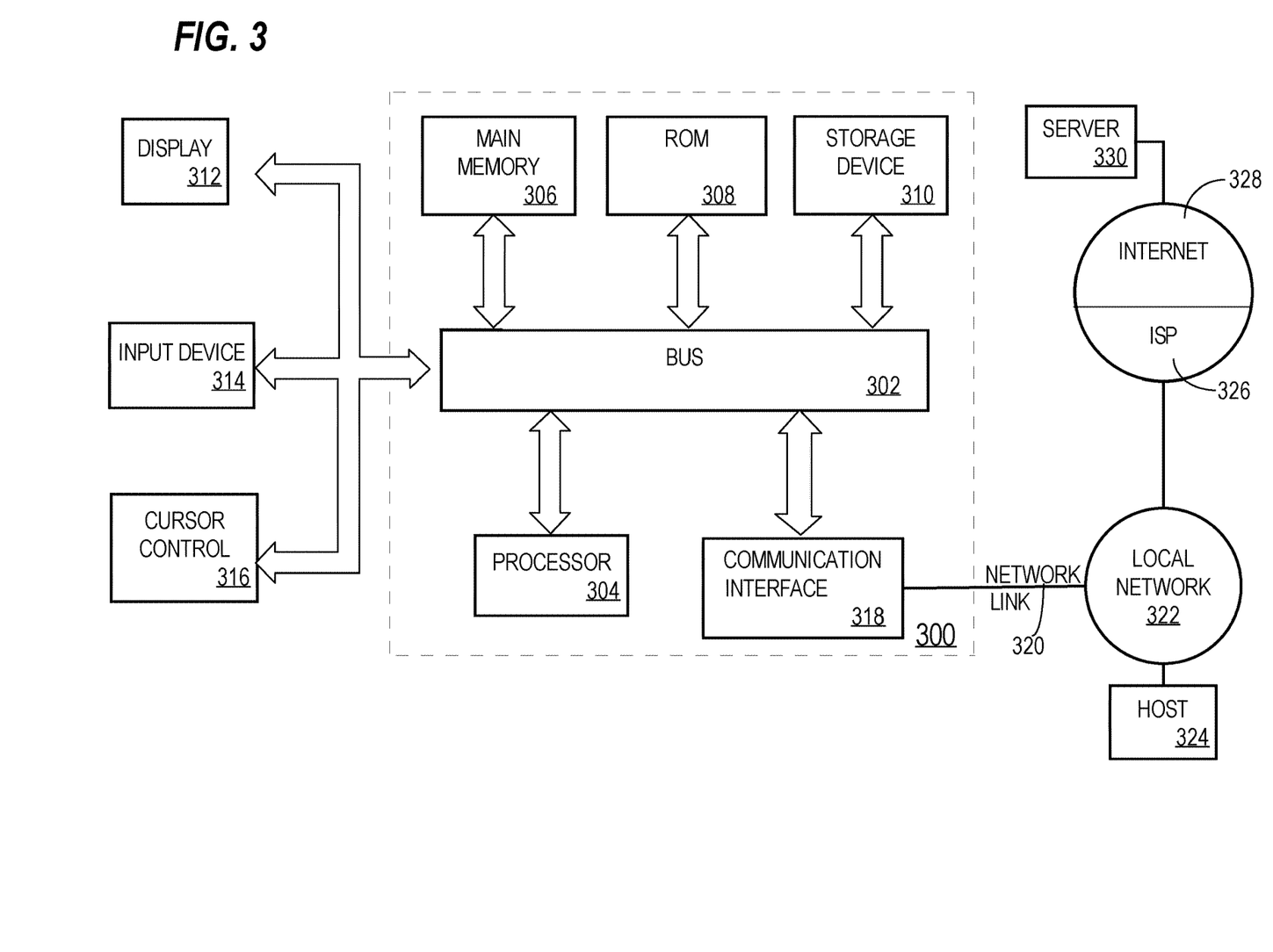
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system comprising:
   one or more processors;
   one or more storage media storing instructions which, when executed by the one or more processors, cause:
   generating usage data associated with a particular entity that is assigned to a first data center of a plurality of data centers that includes a second data center that is different than the first data center;
   wherein the usage data indicates activity of each user of a plurality of users relative to the particular entity;
   after generating the user data, determining, based on the usage data, whether to reassign the particular entity to another data center of the plurality of data centers;
   in response to determining to reassign the particular entity to another data center of the plurality of data centers, assigning the particular entity to the second data centers;
   for each data center of the plurality of data centers:
   identifying a subset of the plurality of users that are associated with said each data center;
   identifying a portion of the usage data that is associated with the subset;
   aggregating the portion of the usage data to generate aggregated usage data for said each data center;
   wherein first aggregated usage data is generated for the first data center and second aggregated usage data is generated for the second data center;
   wherein determining whether to reassign the particular entity to another data center of the plurality of data centers is based on the first aggregated usage data and the second aggregated usage data.

2. The system of claim 1, wherein determining whether to reassign comprises determining, based on the usage data, a number of times that each user in the plurality of users has accessed the particular entity within a particular period of time.

3. The system of claim 1, wherein the usage data indicates latency times associated with each user in the plurality of users.

4. The system of claim 1, wherein the instructions, when executed by the one or more processors, further cause:
   for each data center of the plurality of data centers:
   for each user of the plurality of users:
   determining a latency value associated with said each user and said each data center;
   wherein determining whether to reassign the particular entity to another data center of the plurality of data centers is based on the latency values determined for the plurality of users relative to the plurality of data centers.

5. The system of claim 4, wherein:
determining the latency value for said each user and said each data center comprises generating a cost value for said each user and said each data center based on (a) the latency value of said each user and said each data center and (b) a number of accesses of the particular entity by said each user;
wherein determining whether to reassign the particular entity to another data center of the plurality of data centers is based on the cost values generated for the plurality of users relative to the plurality of data centers.

6. The system of claim 1, wherein the instructions, when executed by the one or more processors, further cause:
determining the first data center or a first geographic region that is associated with the particular entity;
determining whether the first geographic region is different than a second geographic region or whether the first data center is not in a particular subset of the plurality of data centers;
assigning the particular entity to the second data center only if the first geographic region is different than the second geographic region or only if the first data center is not in the particular subset of the plurality of data centers.

7. The system of claim 6, wherein the usage data is first usage data and the plurality of users is a first plurality of users, wherein the instructions, when executed by the one or more processors, further cause:
generating second usage data associated with a second entity that is assigned to a third data center of the plurality of data centers;
wherein the second usage data indicates usage of the second entity by each user of a second plurality of users;
determining that the second entity is associated with a third geographic region that is different than the second geographic region;
in response to determining that the third geographic region is different than the second geographic region, determining, based on the second usage data, whether to reassign the particular entity to another data center in a strict subset of the plurality of data centers;
wherein the strict subset excludes multiple data centers from the plurality of data centers.

8. The system of claim 1, wherein the instructions, when executed by the one or more processors, further cause:
for each user of the plurality of users:
determining a latency of said each user with respect to the second data center;
comparing the latency of said each user to a particular threshold;
wherein the particular entity is assigned to the second data center only if the latency is less than the particular threshold.

9. The system of claim 1, wherein the particular entity comprises data that is only to be accessed at one of the plurality of data centers in order to prevent overwriting a later version of the data or reading an incorrect version of the data.

10. The system of claim 1, wherein the instructions, when executed by the one or more processors, further cause:
prior to determining whether to reassign, causing first requests that are associated with the particular entity to be routed to the first data center;
after reassigning the particular entity to the second data center, causing second requests that are associated with the particular entity to be routed to the second data center.

11. The system of claim 1, wherein assigning the particular entity to the second data center comprises causing assignment data in each data center of the plurality of data centers to indicate that the particular entity is assigned to the second data center.

12. A method comprising:
generating usage data associated with a particular entity that is assigned to a first data center of a plurality of data centers that includes a second data center that is different than the first data center;
wherein the usage data indicates activity of each user of a plurality of users relative to the particular entity;
after generating the user data, determining, based on the usage data, whether to reassign the particular entity to another data center of the plurality of data centers;
in response to determining to reassign the particular entity to another data center of the plurality of data centers, assigning the particular entity to the second data center;
for each data center of the plurality of data centers:
identifying a subset of the plurality of users that are associated with said each data center;
identifying a portion of the usage data that is associated with the subset;
aggregating the portion of the usage data to generate aggregated usage data for said each data center;
wherein first aggregated usage data is generated for the first data center and second aggregated usage data is generated for the second data center;
wherein determining whether to reassign the particular entity to another data center of the plurality of data centers is based on the first aggregated usage data and the second aggregated usage data;
wherein the method is performed by one or more computing devices.

13. The method of claim 12, wherein determining whether to reassign comprises determining, based on the usage data, a number of times that each user in the plurality of users has accessed the particular entity within a particular period of time.

14. The method of claim 12, wherein the usage data indicates latency times associated with each user in the plurality of users.

15. The method of claim 12, further comprising:
for each data center of the plurality of data centers:
for each user of the plurality of users:
determining a latency value associated with said each user and said each data center;
wherein determining whether to reassign the particular entity to another data center of the plurality of data centers is based on the latency values determined for the plurality of users relative to the plurality of data centers.

16. The method of claim 15, wherein:
determining the latency value for said each user and said each data center comprises generating a cost value for said each user and said each data center based on (a) the latency value of said each user and said each data center and (b) a number of accesses of the particular entity by said each user;
wherein determining whether to reassign the particular entity to another data center of the plurality of data centers is based on the cost values generated for the plurality of users relative to the plurality of data centers.

17. The method of claim 12, further comprising:

determining the first data center or a first geographic region that is associated with the particular entity;

determining whether the first geographic region is different than a second geographic region or whether the first data center is not in a particular subset of the plurality of data centers;

assigning the particular entity to the second data center only if the first geographic region is different than the second geographic region or only if the first data center is not in the particular subset of the plurality of data centers.

18. The method of claim 17, wherein the usage data is first usage data and the plurality of users is a first plurality of users, the method further comprising:

generating second usage data associated with a second entity that is assigned to a third data center of the plurality of data centers;

wherein the second usage data indicates usage of the second entity by each user of a second plurality of users;

determining that the second entity is associated with a third geographic region that is different than the second geographic region;

in response to determining that the third geographic region is different than the second geographic region, determining, based on the second usage data, whether to reassign the particular entity to another data center in a strict subset of the plurality of data centers;

wherein the strict subset excludes multiple data centers from the plurality of data centers.

* * * * *

UNITED STATES PATENT AND TRADEMARK OFFICE
CERTIFICATE OF CORRECTION

| | |
|---|---|
| PATENT NO. | : 10,135,918 B2 |
| APPLICATION NO. | : 15/370190 |
| DATED | : November 20, 2018 |
| INVENTOR(S) | : Yiwen Sun et al. |

It is certified that error appears in the above-identified patent and that said Letters Patent is hereby corrected as shown below:

In the Claims

Column 14
Claim 1: Line 34: Please delete "centers" and insert --center--.

Signed and Sealed this
First Day of January, 2019

Andrei Iancu
*Director of the United States Patent and Trademark Office*